United States Patent [19]

Olson et al.

[11] Patent Number: 4,511,583
[45] Date of Patent: Apr. 16, 1985

[54] FRIED FOODS OF REDUCED OIL ABSORPTION AND METHODS OF PREPARATION EMPLOYING SPRAY OF FILM FORMING AGENT

[75] Inventors: Sharon Olson, St. Paul; Robert Zoss, Minneapolis, both of Minn.

[73] Assignee: General Mills, Inc., Minneapolis, Minn.

[21] Appl. No.: 514,982

[22] Filed: Jul. 18, 1983

[51] Int. Cl.³ .............................................. A23L 1/01
[52] U.S. Cl. ...................................... 426/89; 426/291; 426/293; 426/296; 426/305; 426/92; 426/94; 426/102; 426/302; 426/438
[58] Field of Search .................. 426/289, 291–293, 426/296, 302–305, 310, 555, 652, 576, 578, 89, 92, 94, 102, 438, 439

[56] References Cited

U.S. PATENT DOCUMENTS

| | | | |
|---|---|---|---|
| 3,586,512 | 6/1971 | Mancuso | 426/305 |
| 3,597,227 | 8/1971 | Murray | 426/438 |
| 3,676,158 | 7/1972 | Fischer et al. | 426/305 |
| 3,751,268 | 8/1973 | Van Patten | 426/637 |
| 3,754,931 | 8/1973 | Waitman | 426/808 |
| 4,260,637 | 4/1981 | Rispoli | 426/96 |
| 4,356,202 | 10/1982 | Todd | 426/296 |
| 4,375,484 | 3/1983 | Lee | 426/549 |

*Primary Examiner*—Steven Weinstein
*Assistant Examiner*—Elizabeth A. King
*Attorney, Agent, or Firm*—Gene O. Enockson; John A. O'Toole

[57] ABSTRACT

Disclosed are methods for preparing battered and breaded comestibles, e.g., fish, and fried food products prepared therefrom which exhibit reductions in cooking fat absorbed during frying. The comestibles are prepared by applying an aqueous solution comprising about 25% to 35% of a film forming agent, e.g., gelatin or certain starches in amounts sufficient to provide weight ratio (dry basis) of agent to coating of about 0.15:1 to 0.55:1. Optionally, the coating can be subsequently dried, e.g., forced hot air convection at 250° F. to 700° F., (121° C. to 371° C.). Coated comestibles can contain a batter ranging from about 0.10:1 to 0.85:1 and breading to comestible weight ratio of 0.05:1 to 0.20:1. The coated comestibles can then be par-fried in hot oil for about 15 to 40 seconds. Oil absorption reductions upon frying range up to about 25% to 50%.

22 Claims, No Drawings

FRIED FOODS OF REDUCED OIL ABSORPTION AND METHODS OF PREPARATION EMPLOYING SPRAY OF FILM FORMING AGENT

BACKGROUND

1. Technical Field

The present invention relates to food products and to their methods of preparation. More particularly, the present invention relates to fried foods and to methods of preparing.

2. The Prior Art

Comestibles such as meat, fish, poultry, vegetables, etc. are commonly batter coated, breaded and then cooked by pan frying or deep fat frying. In particular, for example, fish portions are battered, breaded, par-fried and frozen. The frozen fish products are then sold to the food service industry or to consumers at retail for finish cooking either by baking or finish frying.

The par-fried coated fish portions typically contain from about 8% to 25% oil resulting from absorption during the frying step. Reductions in oil absorption are desired both by the food processor to reduce fryer oil replacement costs and by the consumer for diet and nutrition considerations.

Numerous art attempts have been made to reduce frying oil absorption. Modest reductions in the absorbed cooking fat level have been achieved by removing excess fat after deep fat frying. Typical excess fat removal processes comprise passing the fried product over a vibrating screen to allow the fat to drain off or to use high velocity streams of hot air.

Various methods of solvent extraction of the absorbed fat are also known. Such solvent extraction methods are not commercially practical usually due to problems associated with residual solvents, with high capitalization costs (e.g., using super critical gases as solvents) or with impairment of the products textural and flavor attributes.

Numerous art attempts have also been made to provide low-fat par-fried coated comestibles by limiting fat absorption rather than subsequently removing the absorbed fats. Absorption reduction techniques include reduced cooking times, specific cooking operating conditions, microwave or radiant heat cooking whether full or partial substitution for frying, surface drying or the like. Other attempts have included adding ingredients to the batter or breading to reduce oil pickup. In particular, the starch products industry advertise numerous starches for inclusion into the coating which are claimed to reduce oil absorption. Generally, however, the addition of these dry starches result in modest, if any reductions in oil absorption, e.g., up to 3% to 5% reductions in the weight of oil absorbed.

Given the state of the par-fried coated comestible art as described above, there is a continuing need for new and useful par-fried breaded and battered comestible products which contain reduced levels of absorbed fat but which possess desirable characteristic organoleptic and textural fried food attributes. Accordingly, it is an object of the present invention to provide new and useful coated comestibles and methods for their preparation characterized by reduced fat levels.

It is a further object of the present invention to provide fried food products which are crisper upon oven heating and methods for the preparation of such extra crispy fried food products.

It has been surprisingly discovered that the above objectives can be realized and superior coated comestibles provided which contain reduced fat levels as well as retail conventional fried organoleptic and textural attributes. The present breaded food products are prepared having an oil absorption barrier applied by the process of the present invention.

SUMMARY OF THE INVENTION

The present invention relates to breading and battered coated comestibles which exhibit reduced cooking fat absorption upon fat frying, and to par-fried foods of reduced fat content. In its method aspect, the present invention embraces methods for preparing such breading, coated comestibles and par-fried foods.

In the preferred embodiment the present comestibles are prepared by first providing a battered and breaded coated comestible. An aqueous solution of a film forming agent such as gelatin and certain starches is applied to the comestible. The solution desirably comprises from about 10% to 35% by weight of a film forming agent. Sufficient amounts of the solution are applied such that the weight ratio of film forming agent (dry basis) to coated comestible ranges from about 0.02:1 to 0.06:1.

The starch coated comestible is then par-fried in an edible fatty triglyceride at conventional temperatures until the batter is set and the coating browned as desired. Typical par-frying times range from about 15 to 40 seconds.

The resultant fried foods are characterized by reductions in absorbed cooking fat of up to about 25%.

DETAILED DESCRIPTION OF THE INVENTION

The present invention relates to coated comestibles and to par-fried foods realized by frying the comestibles which exhibit reduced oil absorption. In its method aspect, the present invention relates to the methods by which products are prepared. Each of these food products as well as product preparation steps and product use are described in greater detail below.

Throughout the specification and claims, percentages and ratios are by weight, and temperatures in degrees Fahrenheit, unless otherwise indicated.

A. Providing Battered and Breaded Comestibles

The present invention is contemplated for use with conventional coated comestibles, i.e., breaded food articles including battered and breaded articles. Any breaded comestible, i.e., coated with breading crumbs which is to be fried or par-fried can be used herein.

The present method is to be practiced with conventional battered and breaded comstibles. Appropriate comestibles herein include such categories as meat, fish, poultry and vegetables. For example, chicken pieces, chicken cutlets, pork chops, fish fillets or portions, and vegetable strips, e.g., onion are suitable.

After appropriate preparatory steps, e.g., cleaning, slicing or sizing, the comestible pieces are enrobed with a conventional batter whether light (i.e., a liquid batter of an adhesive nature designed for subsequent application of breading) or viscous, although light batters are preferred (i.e., those batters not designed for subsequent application of additional coating materials).

The term "breading crumbs" is used in its conventional sense to refer to any farinaceous material commonly used to coat comestibles prior to deep fat frying.

Thus, breading crumbs embrace such conventional breading materials as ground crackers or bread, coarse cut corn meal, flours, e.g., wheat or rye flour. Breading crumbs also embrace mixtures of these and other materials typically used for breading purposes. Such mixtures may further include sugars, milk solids, starches, e.g., corn starch and various seasonings including salt, garlic, pepper. Breading crumb materials are widely available from a variety of commercial food ingredient suppliers. Preferred for use herein for breading crumbs are those available commercially from Newlywed Foods referred to as "Japanese style" and Specialty Products Division of the Gorton Group, a division of General Mills, Inc. Less preferred due to added oil but nonetheless suitable for use are precooked bread crumbs such as are disclosed in U.S. Pat. No. 4,068,009 (issued Jan. 10, 1978 to Rispoli et al.), U.S. Pat. No. 4,218,485 (issued Aug. 19, 1980 to Lee et al.), U.S. Pat. No. 4,208,442 (issued June 17, 1980 to Evans et al.) each of which is incorporated herein by reference.

The particle size of the breading crumbs is not critical. However, for best results, the preferred size ranges from about 0.84 to 4 mm., i.e., such that at least 75% of the material passes through a No. 5 mesh size U.S. Standard size sieve and at least 65% is retained on a No. 20 size sieve. Preferably, the particle size ranges from about 1.5 to 4.0 mm. since smaller particles are more prone to the balling problem referred to below.

Any conventional batters whether light (i.e., a liquid batter of an adhesive nature designed for subsequent application of breading) or viscous batter can be used although light batters are preferred. Such batters are well known to the skilled artisan or even home cooks. Even such simple "batters" as beaten eggs can be used.

Preferred for use herein are batters (light batters designed especially for facilitating adherence of breading). Such batters generally comprise about 35% to 40% flour, 0.5% to 1.0% salt, 0.2% to 0.5% spices, from about 1.5% to 2.0% soda or leavening, from about 45% to 55% moisture, 3.5% to 4.0% starch, 2.5% to 3.5% whole eggs, 1% to 3% shortening, and 1.5% to 2.0% sugar.

The amount of batter is not critical but sufficient batter amounts should be employed so as to provide for adherence of breading such that the weight ratio of breading to comestible ranges from about 0.05:1 to 0.20:1, preferably from about 0.11:1 to 0.15:1. Good results have been obtained when the batter to comestible ranges from about 0.10:1 to 0.85:1. Better results in terms of maximization of both breading adherency and organoleptic desirability are obtained when the batter to comestible ranges from about 0.50:1 to 0.75:1.

In commercial preparation of, for example, fish portions, the batter is applied by cascade and/or by immersion of the fish comestible into batter baths. Thereafter, the battered fish comestibles are breaded with commercial breading machines.

B. Spraying the Coated Comestible

The coated comestibles such as prepared above are desirably coated by applying an aqueous solution containing a film forming agent(s) such as gelatin or film forming starches. While not wishing to be bound by the proposed theory, it is speculated herein that upon drying during frying, the starch or gelatin film importantly prevents oil absorption by the finished breading product upon frying.

Suitable starch materials include any starch or mixtures thereof which upon drying from an aqueous solution forms a continuous film. Starches from a variety of cereals may be employed including corn, wheat, rice, rye, barley and mixtures thereof. Non-cereal starches may be derived from arrowroot, potato, tapioca and the like. The term starch is used herein also to include the various modified starches such as dextrans, oxidized starch, starch derivatives and the like. Some starches will form a flexible film while others will form brittle films. While each of these film forming starches are useful, those forming flexible films are preferred. Gelatin may also be used in whole or in part as the film forming agent herein. Preferred for use herein are low strength gelatins, i.e., having a Bloom strength of 150 or less, preferably about 25 to 75. Lower strength gelatins are preferred since high strength aqueous solutions can be applied at lower solution temperatures due to the lower gelling point temperatures. Gelatins of various Bloom strength are very well known and the skilled artisan will have no problem selecting among the various materials commercially available.

If desired, the skilled artisan can employ the simple following test to determine whether a particular starch or other material is suitably film forming. The aqueous solution is spread evenly over a glass plate and allowed to dry. When the solution is dry, a film remains which can be removed from the plate. Of course, many starch materials will dry to a loose particle form. The film is then dipped into a hot fat, e.g., 390° F., (199° C.) soybean oil for 15 to 40 seconds. If the film does not dissolve, then the starch is sufficiently lipophobic and/or is sufficiently resistant to disintegration during frying.

It is important that the aqueous solution of film forming agents be applied in sufficient amounts so as, upon subsequent drying to realize breaded comestibles exhibiting reduced oil absorbency. Good results have been obtained when the weight ratio (dry basis) of agent applied to the coated food item ranges from about 0.15:1 to 0.55:1. Better results in terms of evenly and completely coating the coated comestible are obtained when the weight ratio ranges from 0.20:1 to 0.30:1. For best results, a weight ratio of about 0.25:1 is preferred.

The aqueous solution is desirably applied at a temperature range of 65° F. to 125° F., (18° C. to 38° C.) to include gelatins over 75 Bloom. Low solution temperatures can adversely affect evenness of coating applications plus adversely affect starch dissolution and viscosity. Additionally, excessive temperatures can lead to undesirable additional toasting of the breading crumbs. Excessive temperatures are to be avoided since high solution temperatures can adversely affect certain breading material texture, particle size or other organoleptic attributes.

The temperature, concentration of the aqueous solution and the selection of film forming agents are interrelated variables. It is of course desired that the solution be as cool and as concentrated and yet as easily sprayable or otherwise applicable as possible. With gelatin and less soluble starches, higher solution temperatures and lower concentrations should be used. For example, with gelatin as the sole film forming agent, solution concentrations of about 10% to 20% are useful and about 15% for best results. The temperature of the solution during application should remain above the gelling point. Thus, useful solution temperature ranges from about 90° F. to 125° F. (32° C. to 52° C.). Even gelatin solutions will vary depending upon the particular gelatin selected depending principally upon the Bloom strength of the gelatin. Higher strength gelatins are used at lower concentrations and at higher temperatures within the above range. Generally, starches can be used at concentrations ranging from about 25% to 35%. Useful solution application temperatures range from about 68° F. to 100° F. (18° C. to 38° C.).

However, the primary consideration affecting selection of particular solution application temperature results from the solution properties of the starch material employed, primarily its solubility and viscosity. Many starches are not sufficiently soluble and/or form high viscosity solutions at low temperatures. Such problems are usually easily overcome by heating the aqueous starch solution as needed.

Any convention application equipment and technique can be employed herein. Preferred techniques include enrobing and spraying. To minimize handling problems, e.g., clogging of sprayer nozzles, it is preferred that the concentration of the aqueous solution when starch is the agent employed range from about 25% to 35% and from about 30% to 35% for best results. Also, it is of course desirable that the solution be substantially free from clumps or undissolved starch.

In another embodiment of the present invention, the starch can be applied as a solid by dusting the surface of the coated comestible. The dusted comestibles can then be passed through a spray of water. The water will wet the starch dusted on the comestible and form a thin starch film on its surface.

Preferred for use herein are cold water soluble, film forming starches as the film forming agent. If gelatin is employed, hot water, i.e., at least about 125° F. should be used. Quick dissolving gelatin/sugar matrices can also be used. If desired, the coated food item portions can also be dried to remove the added moisture. The advantage of this embodiment is the minimization or even elimination of the drying step described below due to greater control over the amount of water applied as a spray.

C. Intermediate Drying

In the most preferred embodiment of the present invention, the sprayed, coated comestibles are dried to remove some or preferably substantially all moisture added prior to frying. Oil absorption is minimized by drying the film forming agent to a film prior to par-frying. Oil reductions compared to untreated coated comestibles of up to about 50% can be realized. It is believed that drying to form a film on the coated comestible prior to par-frying results in preventing initial penetration of the oil into the surface of the coated comestible.

Conventional dehydration equipment and techniques can be used to practice this drying. Preferred for use is forced hot air convection drying with air temperatures ranging from about 300° F. to 700° F., (149° C. to 371° C.) and preferably from about 400° F. to 600° F., (121° C. to 315° C.).

While the step can be practiced with mere partial drying, the significant improvements in oil absorption minimization are best achieved with substantially complete drying of the added moisture. Of course, this drying step is intended to remove only the surface or superficial moisture added.

D. Par-Frying

The coated comestibles prepared as above or intermediate products herein can be frozen and distributed for fry cooking to the institutional or retail trades. Such products upon frying exhibit the oil absorption minimization benefits of the present invention.

Commonly, however, the coated comestibles are subjected to a partial fry cooking step or par-frying. The coated comestibles are pan par-fried or deep fat par-fried in an edible cooking fat or oil as desired, e.g., until the covering is brown and the batter is firmly set. Suitable cooking fats include the common cooking oils, e.g., soybean oil, cottonseed oil, corn oil, safflower or sunflower seed oils, and the like. Typical fat temperatures range from about 325° F. to 405° F., (163° C. to 207° C.) preferably 375° F. to 400° F., (191° C. to 204° C.) and below the smoke point temperature of the fat. Typical frying times range from about 15 to 40 seconds.

The resultant fried food products of the present invention are generally characterized by reduced amounts of oil absorption. Reductions of up to about 25% and up to 50% in the preferred embodiments can be expected depending upon such factors as amount of breading employed, type and amount of starch, and duration of the frying step. For example, breaded fish portions typically might contain 12% absorbed cooking fat while fried foods of the present invention otherwise similarly prepared except for the bread crumb preparation might contain as little as 8.5% absorbed cooking fat. The organoleptic attributes of taste, texture, and, importantly appearance are not adversely affected by the methods of the present invention.

The fried food products of the present invention can be frozen and packaged and distributed to the trade in any conventional manner, e.g., cardboard packaged and distributed frozen at apx. 8° F., (−13° C.).

The consumer can finish heat or cook the fried food item by baking, microwave heating or finish frying in any conventional manner. The resultant product, even when finish cooked by finish frying, is characterized by reduced levels of absorbed cooking fat.

Appropriate comestibles as food substrates herein include such categories as meat, fish, poultry and vegetables. For example, chicken pieces, chicken cutlets, pork chops, fish fillets, fish portions, and vegetable strips, e.g., onion, are all suitable.

The following examples illustrate the various facets of the present invention. It is to be understood, however, that these examples are merely meant to be illustrative and the invention is not to be limited thereto.

EXAMPLE 1

Fried, coated comestibles of the present invention were made according to the following bench scale procedure:

Six fish portions made from pressed pollack and cut into 2½×2½×½ inch squares weighing 25 grams each, were dipped in a batter made with the following ingredients:

| | |
|---|---|
| Dry mix | 50.0% |
| Water | 46.0 |
| Whole fresh eggs | 3.0 |
| Shortening | 1.0 |
| | 100.0% |

The dry mix contained the following:

| | |
|---|---|
| White bleached flour | 80.0% |
| Modified starch | 8.0 |
| Soda | 3.0 |
| Whey | 2.5 |
| Sugar | 2.5 |
| Salt | 2.0 |
| NFM (non-fat dry milk solis) | 1.5 |
| MSG (mono-sodium glutamate) | 0.5 |
| | 100.0% |

The batter was mixed with an electric mixer to remove any lumps. The mixture was let to stand for 10 minutes. After 10 minutes, the batter was beaten by hand for 15 strokes. About 110 grams of batter was used for six fish portions.

The battered fish portions were placed in a $13 \times 9 \times 2\frac{1}{2}$ inch pan which contained Japanese-style bread crumbs. The battered fish portions were coated on top, bottom, and sides with the bread crumbs. A ratio of crumb to battered fish of 0.16:1 was used. (Each battered fish portion picked up about 7 grams of the bread crumbs). The battered fish portions were pressed onto the bed of bread crumbs to assure the crumbs of sticking to the portions.

A 15% by weight aqueous gelatin solution was made by dispersing 60 grams of a 75 Bloom gelatin in 340 grams of 115° F., (46° C.) water in a kitchen size blender. The gelatin solution was poured into a hand-held airless paint sprayer and 13 grams of the 15% solution were sprayed uniformly, covering all sides of each battered and breaded fish portion. The final ratio of gelatin to battered and breaded fish portion was 0.04:1.

Each breaded and battered fish portion was placed in a standard frying basket, $8 \times 4 \times 4$ inches, and submerged into a bath of Durkex 100 TM, (a partially hydrogenated soybean oil marketed by Durkee Foods, Division of SCM Corp.) at 390° F., (199° C.) for 20 seconds.

The par-fried breaded and battered fish portions were frozen for 24 hours followed by baking at 400° F. for 25 minutes. The product was crispy and was analytically determined to have 25% less oil than otherwise identically prepared battered and breaded fish portions which had not been sprayed with a gelatin film prior to frying.

Fried food products of substantially similar reductions in absorbed cooking fat are prepared when the fish portions are substituted for equivalent portions derived from poultry, veal or vegetables.

EXAMPLE 2

Battered and breaded fish portions of the present invention were made according to the following bench scale procedure.

Battered and breaded fish were prepared as in Example 1. The breaded and battered fish portions were placed in a $13 \times 9 \times 2\frac{1}{2}$ inch pan which contained Maltrin M040 TM, a film forming starch produced by Grain Processing Corp., in a dry powdery form. The breaded fish portions were coated on top, bottom, and sides with the dry starch. Excess starch was blown off the fish portions with an air knife blowing low velocity air so that the final ratio of dry starch to battered and breaded fish portion was 0.03:1. A water spray was applied to the dusted portions via an air atomizing sprayer until the starch was completely wetted on all sides. The ratio of starch to water was 0.33:1.

The fish portions were fried, stored frozen for 24 hours, and baked as in Example 1.

The product was crispy and was characterized by an oil absorption of 30% less than equivalent fish portions which had not been coated with the starch and water spray.

EXAMPLE 3

Battered and breaded fish portions were prepared as described above in Example 2 but with an added drying step prior to par-frying.

The wetted starch coated fish portions were placed on a baking sheet sprayed with Pam TM, an aerosol spray of lecithin and vegetable oil carrier to prevent sticking, and placed in a broiler oven at 500° F., (260° C.) for 30 seconds. The portions were turned over and heat treated for another 30 seconds. The portions lost about 90% of the water used to wet the starch and a shiny starch film was visible on the surface of the crumbs.

The starch coated fish portions were placed in a standard frying basket and par-fried as in Examples 1 and 2. The finished product was also crispy and characterized by an oil reduction of 50% compared to fish portions which had not been coated with the starch and water spray and dried prior to par-frying.

EXAMPLE 4

Battered and breaded fish portions of the present invention were prepared according to the following plant procedure.

Two hundred fifty gram blocks of pressed pollack were cut into ten square portions on standard plant scale fish cutting equipment. Each square weighed 25 grams and had dimensions of $2\frac{1}{2} \times 2\frac{1}{2} \times \frac{1}{2}$ inch. The fish squares were conveyed into a standard plant size batter tank containing the batter mix of Example 1 which was made in a 200 lb. (90.9 kg.) Hobart TM mixer.

Each fish square picked up about 18 grams of batter so that the ratio of batter to fish was 0.72:1. The battered fish squares were conveyed through a commercial breader where they were coated with Japanese-style bread crumbs made by Newlywed Foods, having the following particle size distribution:

| Mesh Size (U.S. Standard) | Weight % |
|---|---|
| On No. 5 | 28.0 |
| Through No. 5 on No. 6 | 17.0 |
| Through No. 6 on No. 10 | 24.0 |
| Through No. 10 on No. 16 | 15.0 |
| Through No. 16 on No. 18 | 4.0 |
| Through No. 18 on No. 20 | 1.5 |
| On No. 20 | 10.5 |
| | 100.0% |

Each battered fish portion picked up about 7 grams of bread crumbs so that the combined batter and breading to fish ratio was 1:1.

The battered and breaded fish portions were conveyed through a spray tunnel where a 25% starch solution was sprayed onto the portions. The spray tunnel consisted of one row of 6 spray nozzles, 60 microns in diameter, 14 inches above the conveyor belt and one row 14 inches below the conveyor belt.

The 25% starch solution was made by dispersing dry Maltrin M040 TM starch, made by Grain Processing Corp., in 68° F., (20° C.) water in a 400 lb., (181 kg.) capacity commercial blender and pumped through the spray nozzles at about three gpm, (1 l./s.) and 16 psig liquid pressure. An air line was fed to each nozzle to atomize the starch solution into a fine spray. An air pressure of 20 psig (21.7 kPa.) and about eight standard cubic ft. per min., (3.7 l./s.) was fed to the air lines. Each battered and breaded fish portion was sprayed with eight grams of the 25% starch solution so that each portion contained a ratio of dry starch to battered and breaded fish portions of 0.04:1.

The sprayed portions were conveyed to a standard plant fryer which contained Durkex 100 ™, partially hydrogenated soybean oil, at 400° F., (204° C.) for 25 seconds. The portions were then frozen for 24 hours followed by baking at 400° F., (204° C.) for 25 minutes in a kitchen oven. The product was crispy and had 30% less oil than if the battered and breaded fish portions had not been sprayed with a starch solution.

What is claimed is:

1. A process for preparing a battered and breaded fried food item with reduced oil absorption, wherein the weight ratio of combined batter and breading to said food item ranges from about 0.25:1 to 1.2:1, comprising:
   A. applying to said battered and breaded food item an aqueous solution containing from about 10% to 35% by weight of the solution of a film forming agent in amounts such that the weight ratio of said agent on a dry basis to said food item ranges from about 0.02:1 to 0.06:1, to form a coated food item, and
   B. frying said coated food item in an edible fatty triglyceride having a temperature ranging from about 325° F. to 405° F. for about 15 to 40 seconds to form a fried breaded food item having an oil content of less than about 16% by weight.

2. The process of claim 1 wherein the film forming agent is starch.

3. The process of claim 2 wherein the starch comprises about 25% to 35% by weight of the solution.

4. The process of claim 3 wherein the starch comprises about 30% to 35% by weight of the solution.

5. The process of claim 1, additionally comprising the step prior to the frying step of:
   drying the coated food item to remove at least 70% of the moisture supplied by the aqueous solution.

6. The process of claim 1 wherein the film forming agent is gelatin.

7. The process of claim 6 wherein the gelatin comprises about 10% to 20% by weight of the solution and wherein the solution is applied at a temperature of about 90° F. to 125° F.

8. The process of claim 7, additionally comprising the step of:
   drying the coated food item to remove at least 70% of the moisture supplied by the solution.

9. The process of claim 8 wherein the gelatin has a Bloom strength of less than 75 and wherein the gelatin comprises about 15% by weight of the solution.

10. The food product prepared by the process of claim 6 or 8.

11. The process of claim 8 wherein the coated food item is dried with hot air convection with air temperatures ranging from about 300° F. to 700° F.

12. A process for preparing a battered and breaded fried food item with reduced oil absorption upon deep fat frying, wherein the weight ratio of combined batter and breading to said food item ranges from about 0.25:1 to 1.2:1, comprising
   A. evenly applying to said battered and breaded food item a powdered dry film forming agent such that the weight ratio of said agent to said food item ranges from about 0.01:1 to 0.06:1 to form a film coated food item;
   B. applying an aqueous spray to the said coated food item in a weight ratio of said agent to water of about 0.11:1 to 0.54:1 to form a wetted film on the surface of said coated food item; and
   C. frying said film, coated food item in an edible fatty triglyceride having a temperature ranging from about 325° F. to 405° F. for about 15 to 40 seconds to form a fried, coated food item having an oil content of less than about 16% by weight.

13. The process of claim 12 wherein the film forming agent is starch.

14. The process of claim 13 wherein the starch comprises about 25% to 35% by weight of the solution.

15. The process of claim 14 wherein starch comprises about 30% to 35% by weight of the solution.

16. The process of claim 12, additionally comprising the step prior to the frying step of:
   drying the coated food item to remove at least 70% of the moisture supplied by the aqueous spray.

17. The process of claim 16 wherein the coated food item is dried with hot air convection with air temperatures ranging from about 300° F. to 700° F.

18. The process of claim 12 wherein the film forming agent is gelatin.

19. The process of claim 18 wherein the gelatin comprises about 10% to 20% by weight of the solution and wherein the solution is applied at a temperature of about 90° F. to 125° F.

20. The process of claim 19, additionally comprising the step of:
   drying the coated food item to remove at least 70% of the moisture supplied by the aqueous spray.

21. The process of claim 20 wherein the gelatin has a Bloom strength of less than 75, comprising about 15% by weight of the solution.

22. The food product prepared by the process of claim 18 or 20.

* * * * *